United States Patent [19]

Ushijima

[11] Patent Number: 4,785,923

[45] Date of Patent: Nov. 22, 1988

[54] SLIPPAGE CONTROL SYSTEM FOR LOCK UP CLUTCH ASSEMBLY FOR FLUID COUPLING, PROVIDING NON-ELECTRONIC MECHANICAL/HYDRAULIC SLIPPAGE CONTROL

[75] Inventor: Fumihiro Ushijima, Toyota, Japan

[73] Assignee: Toyota Jidosha Kabushiki Kaisha, Toyota, Japan

[21] Appl. No.: 46,289

[22] Filed: May 6, 1987

[30] Foreign Application Priority Data

May 27, 1986 [JP] Japan .................. 61-121439

[51] Int. Cl.[4] .............................. F16H 45/02
[52] U.S. Cl. .................. 192/3.3; 192/3.31; 192/103 F
[58] Field of Search ........... 192/3.29, 3.3, 3.31, 192/103 F

[56] References Cited

U.S. PATENT DOCUMENTS

| | | | |
|---|---|---|---|
| 3,752,280 | 8/1973 | Cheek | 192/103 F X |
| 3,966,031 | 6/1976 | Peterson, Jr. et al. | 192/3.3 |
| 3,966,032 | 6/1976 | Koivunen | 192/3.3 |
| 3,972,397 | 8/1976 | Cheek | 192/3.3 |
| 4,002,228 | 1/1977 | Borman | 192/3.3 |
| 4,169,526 | 10/1979 | Malloy | 192/3.3 |
| 4,181,203 | 1/1980 | Malloy | 192/3.3 |
| 4,373,617 | 2/1983 | Mathues | 192/3.31 |
| 4,560,043 | 12/1985 | Murasugi et al. | 192/3.31 |

FOREIGN PATENT DOCUMENTS 57-40162 3/1982 Japan .
57-157860 9/1982 Japan .

Primary Examiner—Rodney H. Bonck
Assistant Examiner—Richard M. Lorence
Attorney, Agent, or Firm—Oblon, Fisher, Spivak, McClelland, & Maier

[57] ABSTRACT

A slip control system for a lock up clutch incorporated in parallel with a fluid torque converter in a transmission, including a pump incorporated in a hub member for supporting a turbine of the torque converter from an output shaft of the transmission so as to provide a delivery proportional to the difference in rotation between the input and output sides of the torque converter, and a spool valve also incorporated in the hub member to be operated by the delivery fluid pressure for engaging the lock up clutch as the delivery pressure of the pump increases, the spool valve also being overridingly operated by a fluid pressure selectively supplied from an outside fluid pressure source to completely throttle the fluid passage when desired.

3 Claims, 2 Drawing Sheets

SLIPPAGE CONTROL SYSTEM FOR LOCK UP CLUTCH ASSEMBLY FOR FLUID COUPLING, PROVIDING NON-ELECTRONIC MECHANICAL/HYDRAULIC SLIPPAGE CONTROL

BACKGROUND OF THE INVENTION

The present invention relates to a slippage control system for a lock up clutch assembly for a fluid coupling such as a torque converter for an automatic transmission for an automotive vehicle such as an automobile, and more particularly relates to such a slippage control system for such a fluid coupling lock up clutch assembly, particularly which allows for a certain amount of slippage of said lock up clutch assembly even when said lock up clutch assembly is engaged, in order to minimize transmission torque shock and vibration.

In the prior art, there have been proposed various types of lock up clutch assembly for a fluid coupling such as a torque converter for an automatic transmission for a vehicle. In Japanese Patent Laying Open Publication Serial No. 57-40162 (1982), which it is not intended hereby to admit as prior art to the present patent application except to the extent in any case required by applicable law, there is disclosed a lock up clutch assembly for a torque converter for an automatic transmission for a vehicle, said lock up clutch assembly being selectively operated so as either to be substantially fully disengaged so as not to provide any substantial dragging, or so as to be substantially fully engaged so as not to provide any substantial slippage. In such a system, when said lock up clutch assembly is substantially fully engaged, the rotational drive and torque supply from the engine of the vehicle are transmitted straight through said lock up clutch assembly from the input of the torque converter to the output of said torque converter, without said lock up clutch assembly providing any substantial slippage between said torque converter input and output, and without any torque conversion or rotational speed alteration or torque shock cushioning function of the torque converter being provided, and thereby the drive losses in said torque converter are reduced to a minimum, and drive train efficiency and also vehicle fuel consumption and responsiveness are maximized.

However, in such a system in which the lock up clutch assembly of the torque converter is provided so as, when engaged, to directly and positively couple together the input member of the torque converter and the output member thereof without allowing any substantial slippage at all therebetween, the problem arises that in such an operational mode the rotational vibration and torque fluctuations which are inevitably present in the power output of the internal combustion engine of the vehicle upon the input side of the torque converter are directly transmitted to the output side of said torque converter and to the automatic transmission and the differential device of the vehicle, which is not desirable since it causes the vibration of the vehicle body as sensed within the passenger compartment thereof to be increased, as well as increasing the noise level within the vehicle and deteriorating the ridability thereof. Further, the stress upon the various components of the automatic transmission and of the differential device of the vehicle is increased, which can deteriorate the reliability and the service life thereof.

Accordingly there was proposed, for instance in Japanese Patent Laying Open Publication Serial No. 57-157860 (1982), which also it is not intended hereby to admit as prior art to the present patent application except to the extent in any case required by applicable law, a slippage control system for a fluid coupling lock up clutch assembly, which was of the electronic type, and according to the operation of which a slight relative rotation was permitted between the input member of the torque converter and the output member thereof, even when the lock up clutch assembly of said torque converter was in the so called locked up state. With such a slippage control system for a fluid coupling lock up clutch assembly, when the lock up clutch assembly is in the so called locked up condition, then nevertheless a certain amount of relative rotation is permitted between the input member of the torque converter and the output member thereof, thus cushioning between said input member and said output member of said torque converter and inhibiting or substantially preventing rotational vibration and torque fluctuations present in the power output of the internal combustion engine of the vehicle from being directly transmitted through said lock up clutch assembly to the automatic transmission and thence to the differential device of the vehicle. Thereby, vibration of the vehicle body as sensed within the passenger compartment is kept low, and also the noise level within the vehicle passenger compartment is minimized, whereby the ridability of the vehicle is enhanced. Further, the stress upon the various components of the automatic transmission and of the differential device of the vehicle is reduced, thus enhancing the reliability and the service life thereof.

There is however a problem with such a slippage control system for a fluid coupling lock up clutch assembly, in that sensors are required to be provided for detecting the rotational speeds of the input and the output members of the torque converter, and the outputs from these rotational speed sensors are then fed to a microcomputer which is also required to be provided, which computes the difference between said rotational speeds of said input and output members of said torque converter, and which then controls the hydraulic fluid pressure which is supplied as an actuating hydraulic fluid pressure to the lock up clutch assembly according to this rotational speed difference, so as (for example) to maintain said rotational speed difference so as to be within a determinate range, i.e. so as to be neither too high nor too low. This form of construction inevitably causes the slippage control system for the lock up clutch assembly for the torque converter to be relatively complicated, accordingly raising its inherent cost and also increasing the cost of assembly of said slippage control system to the vehicle. Further, since various electrical components such as rotational speed sensors and a microcomputer and the like are required to be incorporated in such a slippage control system of an electronic type construction, its reliability is inevitably not as high as could be desired.

SUMMARY OF THE INVENTION

The inventors of the present invention have considered the various problems detailed above, from the point of view of the desirability of allowing some slippage of a lock up clutch assembly of a fluid coupling even when said lock up clutch assembly is in the so called locked up condition, without however making the slippage control system for said lock up clutch assembly unduly complicated or unreliable.

Accordingly, it is the primary object of the present invention to provide a slippage control system for a fluid coupling lock up clutch assembly, which avoids the problems detailed above.

It is a further object of the present invention to provide such a slippage control system for a fluid coupling lock up clutch assembly, which during the so called locked up state of said fluid coupling lock up clutch assembly effectively and reliably prevents that the input member of said lock up clutch assembly and the output member thereof should ever become completely rotationally locked together, and on the contrary always allows a certain degree of slippage between said input member and said output member.

It is a further object of the present invention to provide such a slippage control system for a fluid coupling lock up clutch assembly which effectively prevents rotational vibration and torque fluctuations present in the power fed to said fluid coupling from being directly transmitted through said lock up clutch assembly, when said lock up clutch assembly is in the engaged condition, to the output of said fluid coupling and to devices connected thereto such as a vehicle transmission and/or a differential device.

It is a yet further object of the present invention to provide such a slippage control system for a fluid coupling lock up clutch assembly, which is entirely mechanical and/or hydraulic in its construction.

It is a yet further object of the present invention to provide such a slippage control system for a fluid coupling lock up clutch assembly, which does not incorporate any electronic components.

It is a yet further object of the present invention to provide such a slippage control system for a fluid coupling lock up clutch assembly, which works by a feedback process so as to promote its reliability and effectiveness.

It is a yet further object of the present invention to provide such a slippage control system for a fluid coupling lock up clutch assembly, which has a good response characteristic.

It is a yet further object of the present invention to provide such a slippage control system for a fluid coupling lock up clutch assembly, which has high reliability in itself.

It is a yet further object of the present invention to provide such a slippage control system for a fluid coupling lock up clutch assembly, which maintains high reliability for components to which rotational power is supplied via said fluid coupling.

It is a yet further object of the present invention to provide such a slippage control system for a fluid coupling lock up clutch assembly, which minimizes cost of components.

It is a yet further object of the present invention to provide such a slippage control system for a fluid coupling lock up clutch assembly, which minimizes cost of assembly.

It is a yet further object of the present invention to provide such a slippage control system for a fluid coupling lock up clutch assembly, which minimizes the noise level present in the passenger compartment of a vehicle to which said fluid coupling is fitted.

It is a yet further object of the present invention to provide such a slippage control system for a fluid coupling lock up clutch assembly, which minimizes the vibration level present in the passenger compartment of a vehicle to which said fluid coupling is fitted.

It is a yet further object of the present invention to provide such a slippage control system for a fluid coupling lock up clutch assembly, which maintains the ridability of a vehicle to which said fluid coupling is fitted as high.

According to the most general aspect of the present invention, these and other objects are attained by, for a fluid coupling comprising a fluid force transmission device and a lock up clutch assembly, provided in parallel with respect to transmission of rotation with said fluid force transmission device, and comprising a drive side member and a driven side member which are mutually frictionally rotationally engaged to one another by supply of an actuating hydraulic fluid pressure, with the torque transmission capacity between said drive side member and said driven side member being determined according to the value of said supplied actuating hydraulic fluid pressure: a slippage control system for said lock up clutch assembly, comprising: a hydraulic fluid pump which is driven according to the difference between the rotational speed of said drive side member of said lock up clutch assembly and the rotational speed of said driven side member of said lock up clutch assembly, and producing a hydraulic fluid pressure; and: a control system which increases said actuating hydraulic fluid pressure for said lock up clutch assembly according to an increase in said hydraulic fluid pressure produced by said hydraulic fluid pump. And, optionally but preferably, in this slippage control system for a fluid control lock up clutch assembly, said control system may comprise a drain control valve, which receives said hydraulic fluid pressure produced by said hydraulic fluid pump and is controlled thereby, and which drains said actuating hydraulic fluid pressure for said lock clutch assembly by an amount which is decreased according to increase of said hydraulic fluid pressure produced by said hydraulic fluid pump. Further, optionally but desirably, in either of the cases detailed above, the lock up clutch assembly may incorporate a hub member, and in such a case said hydraulic fluid pump may be incorporated within said hub member of said lock up clutch assembly.

According to such a slippage control system for a fluid coupling lock up clutch assembly as specified above, no special form of control is required, and, based upon the output hydraulic fluid pressure produced by the hydraulic fluid pump, the actuating hydraulic fluid pressure for said lock up clutch assembly is controlled in a form of negative feedback control according to the difference between the rotational speed of the drive side member of the lock up clutch assembly and the rotational speed of the driven side member of said lock up clutch assembly, so that this difference in rotational speeds is maintained at or around an equilibrium value in an automatic manner. Since the engagement of the lock up clutch assembly is thus controlled directly from the output of this hydraulic fluid pump, directly according to the difference between the rotational speed of the drive side member of the lock up clutch assembly and the rotational speed of the driven side member of said lock up clutch assembly, therefore the response is better than with any form of electrical-hydraulic system. In particular, in the case that the hydraulic fluid pump is incorporated into a hub member of the lock up clutch assembly, this allows of a compact design, and allows the hydraulic fluid passages which lead to said hydraulic fluid pump to be relatively short, thus further improving the control response. In other words, the torque transmission capability of the lock up clutch assembly is, of course when said lock up clutch assembly assembly is in the engaged condition, maintained at such a value that, while said lock up clutch assembly never slips unduly, at the same time said lock up clutch assembly never becomes fully locked up. Thus, while avoiding the occurrence of undue slippage of said lock up clutch assembly, at the same time it is ensured that it is effectively and reliably prevented that the input member of said lock up clutch assembly and the output member thereof should ever become completely rotationally locked together, and on the contrary a certain degree of slippage between said input member and said output member is always allowed. By this means, the rotational vibration and torque fluctuations which inevitably are always present in the rotational power fed to this torque converter assembly are always effectively prevented from being directly transmitted through said torque converter assembly, when this lock up clutch assembly is in the engaged condition, to the output of said torque converter assembly and to devices connected thereto such as a vehicle transmission and/or a differential device. Thereby the service life and the reliability of said devices which are further down in the power train are advantageously promoted, and also the noise level and the vibration level present in the passenger compartment of a vehicle to which this torque converter is fitted are reduced, and the ridability of such a vehicle is enhanced. Because this slippage control system for the lock up clutch assembly is entirely mechanical/hydraulic in its construction, and does not incorporate any electronic components, it is reliable and low in cost both with regard to its components and with regard to its assembly. Further, the reliability and the effectiveness of this preferred embodiment of the slippage control system for a fluid coupling lock up clutch assembly of the present invention are promoted by its functioning by a feedback process as detailed above.

BRIEF DESCRIPTION OF THE DRAWINGS

The present invention will now be described with respect to the preferred embodiment thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures; and:

DESCRIPTION OF THE PREFERRED EMBODIMENT

The present invention will not be described with reference to the preferred embodiment thereof, and with reference to the figures.

Overall Torque Converter Structure

Figure 1:
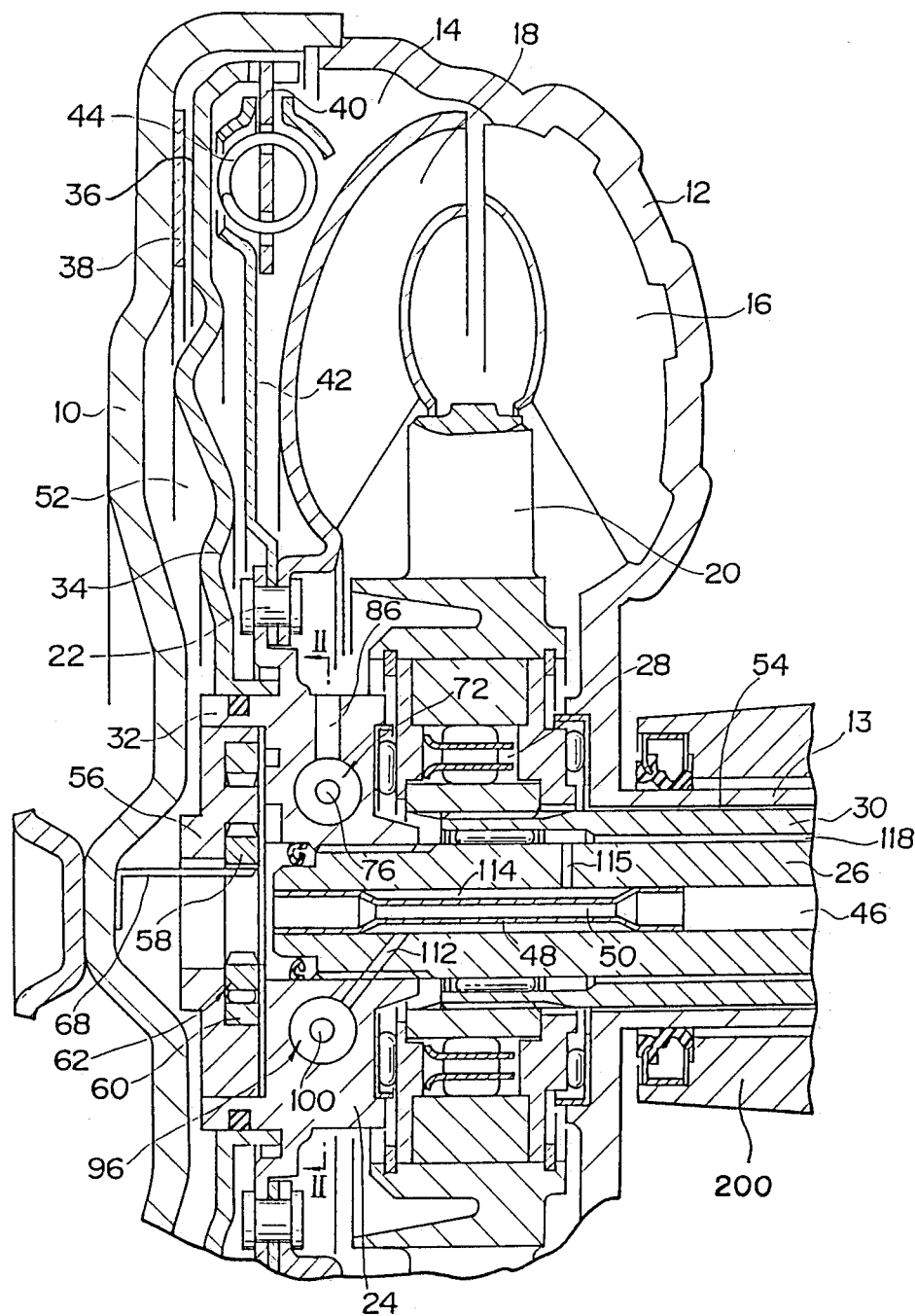
FIG. 1 is a schematic partial axial longitudinal sectional view of a torque converter fitted to a vehicle power train and incorporating a lock up clutch assembly, and of a control system for said lock up clutch assembly which incorporates the preferred embodiment of the slippage control system for a fluid coupling lock up clutch assembly of the present invention.

Referring to FIG. 1, there is therein shown in partial longitudinal cross sectional view a torque converter incorporating a lock up clutch assembly, to which the preferred embodiment of the slippage control system for a fluid coupling lock up clutch assembly of the present invention is provided. The direction to the left as seen in FIG. 1 is the direction towards the front of a vehicle in the power train of which it will in the following discussion be conceptually assumed that the FIG. 1 torque converter is installed, just behind an internal combustion engine of said vehicle and in front of a gear transmission mechanism of an automatic transmission of said vehicle (neither of these units being shown in the figures). This torque converter incorporates a front cover 10 which is rotationally coupled to the power output member (such as the crank shaft) of said internal combustion engine which is not particularly shown, and to the rear side of this front cover 10 there is fixedly attached a torque converter pump outer shell member 12, which accordingly likewise rotates along with said internal combustion engine power output member. The inner portion of said pump outer shell member 12 is formed as a protruding hollow shaft portion 13 which extends to the right out from the portion of the construction shown in the figure and is rotatably received in and is rotatably supported by a hollow tubular protruding portion 200 of the casing of the automatic transmission, which is not particularly otherwise shown; this hollow shaft portion 13 is for driving by its other end (not shown) a hydraulic fluid supply pump (not particularly shown either) for supplying pressurized hydraulic fluid to said automatic transmission, and to this fluid torque converter also, in this exemplary construction to which the preferred embodiment of the slippage control system for a fluid coupling lock up clutch assembly of the present invention is applied. And within this front cover 10 and this pump outer shell member 12 there is defined a torque converter chamber 14.

Within this torque converter chamber 14 there are provided a pump impeller 16, a turbine member 18, and a stator member 20; thus, this torque converter is of the three element two phase type. The pump impeller 16 comprises a number of vanes and so on, integrally formed with the pump outer shell member 12 on the inside surface thereof. The stator member 20 is mounted via a one way clutch 28 on the end of a hollow fixed shaft 30, which extends to the right out from the portion of the construction shown in the figure while being received within the hollow shaft portion 13 of the pump outer shell member 12, and the outer end (not shown) of this hollow fixed shaft 30 is fixedly mounted to the casing of the gear transmission mechanism of the automatic transmission. Thereby the stator member 20 is only allowed to rotate in one rotational direction about the central axis of the construction. And within this hollow fixed shaft 30 there is rotatably mounted a power output shaft 26 of the torque converter, said power output shaft 26 itself being hollow as will be described hereinafter, and this power output shaft 26 is coupled via splines at its left hand end in the figure to a hub member 24, to which the turbine member 18 is coupled (along with a disk member 42 of the lock up clutch assembly, to be explained hereinafter) by a plurality of coupling pins 22.

Thereby, assuming that no lock up clutch assembly action (as will be explained later) is being provided and this torque converter assembly is thus being allowed to function in its normal operational mode, and when as is always the case during vehicle operation the torque converter chamber 14 of said torque converter assembly is filled with transmission fluid which is being constantly pumped thereinto (by the hydraulic fluid supply pump which is mentioned above is driven by the unseen end of the hollow shaft portion 13, or by some other means), then, in a per se known manner by a per se known pattern of circulation of hydraulic fluid within this torque converter chamber 14 around between the pump impeller 16, the turbine member 18, and the stator member 20 in the general fashion of a smoke ring, the rotational power which is being supplied by the engine of the vehicle to the front cover 10 and the pump outer shell member 12 and thence to the pump impeller 16 is transmitted to the turbine member 18 and thence to the power output shaft 26 of this torque converter assembly, with a certain degree of slippage and also of torque amplification being provided.

Structure of the Lock Up Clutch Assembly

Now the structure of the lock up clutch assembly which is provided to this torque converter assembly will be explained. Clamped between the hub member 24 and the turbine member 18 by the coupling pins 22, and thus rotationally fixed to them, there is provided the disk member 42 previously mentioned. And the central portion of said hub member 24 to the left in FIG. 1 is formed as a cylindrical piston support portion 32, on which there is slidably fitted, by a hole in its center, a disk shaped piston member 34 of the lock up clutch assembly. Thus, this disk shaped piston member 34 can be axially slid leftwards and rightwards in FIG. 1, upon the cylindrical piston support portion 32 of the hub member 24. The outer portion of the left side in FIG. 1 of this disk shaped piston member 34 is formed as and constitutes a clutch engaging surface 36, and on the inner face of the front cover 10 of the torque converter, opposing this clutch engaging surface 36, there is provided an annular clutch lining 38, which, when and only when as will be explained hereinafter the disk shaped piston member 34 is impelled by biasing force leftwards as seen in FIG. 1, frictionally rubs against said clutch engaging surface 36 and thereby rotationally engages the disk shaped piston member 34 and the front cover 10 together with a torque transmitting capability being provided therebetween which varies according to the aforesaid biasing force. And the outer peripheral portion of the disk shaped piston member 34 is rotationally engaged with the outer edge portion of an annular member 40, which is itself rotationally engaged, with a certain amount of torque cushioning effect being provided, to the outer portion of the disk member 42 via a plurality of compression coil springs 44 which are fitted in recesses provided by shaped formed in said outer portion of said disk member 42, in a manner which is not clearly explicitly shown in FIG. 1 but will be clear to one of ordinary skill in the relevant art based upon these descriptions and the figure. Thereby, the disk shaped piston member 34 is connected in a torque transmitting manner to the power output shaft 26, via the annular member 40, the compression coil springs 44, the disk member 42, and the hub member 24.

Basic Functioning of this Lock Up Clutch Assembly

When this lock up clutch assembly is to be put into the released state, so as to allow the torque converter assembly to perform its function of rotational power transmission with torque amplification without interference, then the hydraulic fluid for filling the interior of the torque converter chamber 14 is supplied into said torque converter chamber 14 via the central hole 46 of the power output shaft 26, and is exhausted from said torque converter chamber 14 via the gap 54 which is defined between the hollow shaft portion 13 of the pump outer shell member 12 and the hollow fixed shaft 30 which is rotatably fitted therein. In more detail, hydraulic fluid pressurized by the pump not particularly shown but rotationally driven by the hollow shaft portion 13 is supplied into this central hole 46 of the power output shaft 26, and is passed down through said central hole 46 of said power output shaft 26 via a restricted inner passage 50 of a hydraulic fluid passage sleeve 48, so as to be supplied to a piston pressure chamber 52 which is defined between the front cover 10 and the disk shaped piston member 34. Then, this pressurized hydraulic fluid flows out from this piston pressure chamber 52, around the outer periphery of the clutch engaging surface 36 of the disk shaped piston member 34 between it and the inner surface of the front cover 10, to enter into the torque converter chamber 14 so as to act as operating hydraulic fluid for the fluid torque converter assembly. Then, from the torque converter chamber 14, this hydraulic fluid is taken into the left end in the figure of the aforementioned gap 54 and is exhausted rightwards in the figure therethrough back to the hydraulic fluid pressure pump, not particularly shown.

According to this flow pattern of the hydraulic fluid into and out of the torque converter chamber 14, the pressure in the piston pressure chamber 52 to the left of the disk shaped piston member 34 is raised by comparison to the pressure in the torque converter chamber 14 to the right of said disk shaped piston member 34, and accordingly the clutch engaging surface 36 on said disk shaped piston member 34 is kept out of control with the annular clutch lining 38 on the inner surface of the front cover 10, thus allowing the torque converter assembly to perform its function of rotational power transmission with torque amplification without interference, i.e. thus putting the lock up clutch assembly into the released state and ensuring that the only path of torque transmission from the power output shaft of the internal combustion engine (not shown) which drives the front cover 10 of the torque converter assembly to the power output shaft 26 is via the flow action of the fluid within the torque converter chamber 14 between the pump impeller 16 and the turbine member 18.

On the other hand, when this lock up clutch assembly is to be put into the engaged state—or rather, the state which will be called the "engaged" state for the purpose of this disclosure although as will be seen shortly in fact the lock up clutch assembly is not fully engaged during said "engaged" state—so as to preempt the function of the torque converter assembly to perform rotational power transmission with torque amplification, and so as instead to provide substantially direct drive between the power output shaft of the internal combustion engine and the torque converter power output shaft 26, then the hydraulic fluid for filling the interior of the torque converter chamber 14 is supplied into said torque converter chamber 14 from the pump not particularly shown via the gap 54 which is defined between the hollow shaft portion 13 of the pump outer shell member 12 and the hollow fixed shaft 30 which is rotatably fitted therein, and is exhausted from said torque converter chamber 14 via the central hole 46 of the power output shaft 26. In more detail, hydraulic fluid pressurized by the pump not particularly shown is supplied into the right end in the figure of the aforementioned gap 54, and is passed down leftwards in the figure through said gap 54, so as to be supplied into the torque converter chamber 14 so as to act as operating hydraulic fluid for the fluid torque converter assembly. Then, this pressurized hydraulic fluid flows out from this torque converter chamber 14, around the outer periphery of the clutch engaging surface 36 of the disk shaped piston member 34 between it and the inner surface of the front cover 10, to enter into the piston pressure chamber 52. Then, from this piston pressure chamber 52, this hydraulic fluid is taken into the left end in the figure of the central hole 46 of the power output shaft 26, and passes down said central hole 46 in the rightward direction in the figure, via the restricted inner passage 50 of the hydraulic fluid passage sleeve 48, and is exhausted therethrough back to the hydraulic fluid pressure pump, not particularly shown.

According to this flow pattern of the hydraulic fluid into and out of the torque converter chamber 14, the pressure in the torque converter chamber 14 to the right of the disk shaped piston member 34 is raised by comparison to the pressure to the left of said disk shaped piston member 34 in the piston pressure chamber 52, and accordingly the disk shaped piston member 34 is biased in the leftward direction in FIG. 1, so that the clutch engaging surface 36 mounted on its leftward facing surface is pressed into contact with the annular clutch lining 38 on the inner surface of the front cover 10, of course with a pressing force substantially proportional to the difference between the pressure in the torque converter chamber 14 to the right of the disk shaped piston member 34 and the pressure to the left of said disk shaped piston member 34 in the piston pressure chamber 52, thus rotationally engaging together the disk shaped piston member 34 and the front cover 10 of the torque converter, i.e. the power output shaft of the internal combustion engine (not shown) which drives said torque converter assembly front cover 10 and the power output shaft 26, with a torque transmission capacity being provided therebetween which also of course is substantially proportional to the difference between the pressure in the torque converter chamber 14 to the right of the disk shaped piston member 34 and the pressure to the left of said disk shaped piston member 34 in the piston pressure chamber 52. Thereby, the lock up clutch assembly interferes with the function of the torque converter assembly for performing its rotational power transmission with torque amplification, i.e. is put into the engaged state; thus ensuring that a new path of torque transmission from the power output shaft of the internal combustion engine (not shown) which drives the front cover 10 of the torque converter assembly to the power output shaft 26 is established, bypassing the torque transmission flow action of the fluid within the torque converter chamber 14 between the pump impeller 16 and the turbine member 18, and instead substantially directly coupling together the power output shaft of the internal combustion engine and the torque converter power output shaft 26.

The Lock Up Clutch Assembly Slippage Control System

Now, the preferred embodiment of the slippage control system for a fluid coupling lock up clutch assembly of the present invention will be described with regard to its construction and its operation.

Construction

Figure 2:
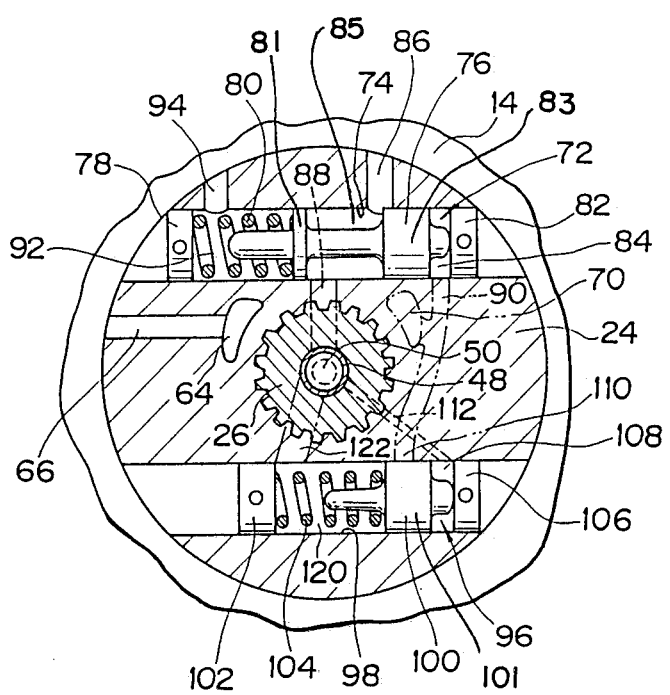
FIG. 2 is a partial sectional view of the torque converter and lock up clutch assembly and slippage control system therefor of FIG. 1, taken in a plan shown by the arrows II—II in FIG. 1.

This slippage control system comprises a hydraulic fluid pump, generally designated as 62 and fitted to the front surface of the hub member 24 (the left side thereof as seen in FIG. 21), and a pair of hydraulic control valves designated as 72 and 96. In more detail, to the front surface of the hub member 24 there is fixed a pump housing 56, and this pump housing 56 and the hub member 24 together between them rotatably support a drive gear 58, which functions as an inner rotor member, and a driven gear 60, which functions as an outer rotor member. Thereby, the slippage control hydraulic fluid pump 62 is constituted as an internal meshing gear wheel type pump. A passage 64, not shown in FIG. 1 but shown in the sectional view of FIG. 2, is formed through the hub member 24, communicating to the torque converter chamber 14 to the right side of the disk shaped piston member 34, and the end portion of this passage 64 functions as the input port for the slippage control hydraulic fluid pump 62, thus supplying said pump 62 with hydraulic fluid at the pressure which currently prevails in said torque converter chamber 14. The drive gear 58 is rotationally coupled to the front cover 10 via a drive lever 68 and accordingly the rotational speed of the slippage control hydraulic fluid pump 62 is equal to the difference between the rotational speed of the front cover 10 and the rotational speed of the hub member 24, i.e. of the power output shaft 26 of the torque converter assembly. In other words, the rotational speed of the slippage control hydraulic fluid pump 62 is equal to the current value of the slippage being provided by the fluid torque converter assembly between its power input member and its power output member, and this implies that the difference between the output pressure and the input pressure of said slippage control hydraulic fluid pump 62 is representative of and increases monotonically along with said fluid torque converter slippage amount. This output pressure of the slippage control hydraulic fluid pump 62 appears at an output port 70 thereof; vide FIG. 2 again.

Referring now to the FIG. 2 view, the drain control valve 72 is mounted within the hub member 24, and comprises: a valve bore 74 formed transversely through said hub member 24; a valve spool element 76 which is mounted within said valve bore 74 so as to be able to slide to and fro therein in the left and right directions as seen in the figure, and on which lands 81 and 83 are formed; an end cap member 78 which is fitted into the open left end in the figure of said valve bore 74; another end cap member 82 which is fitted into the open right end in the figure of said valve bore 74; and a compression coil spring 80 which is mounted within said valve bore 74 between said land 81 on said valve spool element 76 and the end cap member 78, so as to bias said valve spool element 76 in the rightward direction as seen in the figure, thus to decrease the volume of a control chamber 84 defined between said land 83 of said valve spool element 76 and the end cap member 82 and simultaneously to increase the volume of a spring chamber 92 defined between said land 81 of said valve spool element 76 and the other end cap member 78 within which spring chamber 92 said compression coil spring 80 is located. The control chamber 84 is communicated to the output port 70 of the slippage control hydraulic fluid pump 62 via a passage 90, while the spring chamber 92 is communicated with the torque converter chamber 14 on the right side in the figure of the disk shaped piston member 34 of the lock up clutch assembly via a port 94. And a draining chamber 85 is defined between the land 81 and the land 83 of the valve spool element 76, and is communicated to drain via a drain port 88 which leads to the restricted inner passage 50 in the power output shaft 26, while it is communicated to said torque converter chamber 14 of said torque converter assembly via a port 86 which is variably controlled with regard to its flow resistance by said land 83 of said valve spool element 76, according to the axial position of said valve spool element 76 in its said valve bore 74. Thus, the valve spool element 76 reaches an equilibrium axial position in its valve bore 74 according to the current values of: the pressure in said torque converter chamber 14 to the right of the disk shaped piston member 34; the amount of compression of the compression coil spring 80, which itself depends upon the position of said valve spool element 76 in its said valve bore 74; and the pressure in the control chamber 84, which is the output pressure of the slippage control hydraulic fluid pump 62 and therefore as explained above is monotonically related to the difference between the rotational speed of the front cover 10 and the rotational speed of the disk shaped piston member 34 of the lock up clutch assembly, i.e. to the amount of slippage which said lock up clutch assembly is currently undergoing. And, particularly, the greater is the value of said pressure in said control chamber 84, i.e. the greater is the amount of slippage which the lock up clutch assembly is currently undergoing, the further is the valve spool element 76 positioned to the left in its valve bore 74 (for equal values of the pressure in the torque converter chamber 14, as fed to the spring chamber 92), and therefore the higher is the flow resistance with which said torque converter chamber 14 is communicated to drain via the ports 86 and 88 and the restricted inner passage 50 of the power output shaft 26.

Further, the hydraulic control valve 96 is also mounted within the hub member 24, and comprises: a valve bore 98 likewise formed transversely through said hub member 24; a valve spool element 100 which is mounted within said valve bore 98 so as to be able to slide to and fro therein in the left and right directions as seen in the figure and on which a land 101 is formed; an end cap member 102 which is fitted into the open left end in the figure of said valve bore 98; another end cap member 106 which is fitted into the open right end in the figure of said valve bore 98; and a compression coil spring 104 which is mounted within said valve bore 98 between said land 101 on said valve spool element 100 and the end cap member 102, so as to bias said valve spool element 100 in the rightward direction as seen in the figure, thus to decrease the volume of a control chamber 108 defined between said land 81 of said valve spool element 100 and the end cap member 106 and simultaneously to increase the volume of a spring chamber 120 defined between said land 101 of said valve spool element 100 and the other end cap member 102, within which spring chamber 120 said compression coil spring 104 is located. The control chamber 108 is communicated via a passage 112 with the space 114 on the outside of the hydraulic fluid passage sleeve 48 which is fitted in the central hole 46 of the power output shaft 26, and this space 114 is communicated via a hole 115 with a hydraulic fluid passage 118 which is defined between the outer surface of the power output shaft 26 and the inner surface of the hollow fixed shaft 30 within which said power output shaft 26 is rotationally mounted; this hydraulic fluid passage 118 leads to the right as seen in FIG. 1, so as to be communicated to a hydraulic control device housed within the automatic transmission for this vehicle, not otherwise shown, and so as selectively to receive a controlling hydraulic fluid pressure from said hydraulic control device. The spring chamber 120, on the other hand, is communicated via a passage 122 with the restricted inner passage 50 of the hydraulic fluid passage sleeve 48 fitted in the power output shaft 26. And a port 110, to which the output pressure of the slippage control hydraulic fluid pump 62 is supplied from its output port 70, is variably controlled with regard to its flow resistance by said land 101 of said valve spool element 100, according to the axial position of said valve spool element 100 in its said valve bore 98: when no actuating hydraulic fluid pressure is being supplied as described above by the hydraulic control system via said passages 118, 115, 114, 112, and so on to the pressure chamber 108, then the valve spool element 100 is positioned as shown in FIG. 2 to its extreme rightwards position from the point of view of that figure in its valve bore 98 according to the biasing action of the compression coil spring 104 which is not substantially resisted, and in this state of the apparatus the port 110 is interrupted completely by the land 101 of the valve spool element 100 and no pressure is supplied by the slippage control hydraulic fluid pump 62 to the pressure chamber 108. On the other hand, when an actuating hydraulic fluid pressure is being supplied as described above by the hydraulic control system to said passage 118, which is done when the vehicle is travelling at high speed so that engine rotation vibration and the like do not present any substantial problem and the slippage control as performed by this preferred embodiment of the slippage control system for a fluid coupling lock up clutch assembly of the present invention is not required, then this hydraulic fluid pressure is transmitted from said passage 118 via said passages 115, 114, 112, and so on to the pressure chamber 108 and then the valve spool element 100 is positioned to its extreme leftwards position from the point of view of FIG. 2 in its valve bore 98 against the biasing action of the compression coil spring 104 which is overcome, and in this state of the apparatus the port 110 is not substantially interrupted by the land 101 of the valve spool element 100, and the pressure chamber 108 and the port 110 are communicated together, thus communicating together said pressure chamber 108 and the output port 70 of the slippage control hydraulic fluid pump 62.

Operation

This preferred embodiment of the slippage control system for a fluid coupling lock up clutch assembly of the present invention operates as follows, in the circumstances of lock up clutch assembly engagement when the hydraulic fluid for filling the interior of the torque converter chamber 14 is being supplied into the torque converter chamber 14 from the pump not particularly shown via the gap 54 which is defined between the hollow shaft portion 13 of the pump outer shell member 12 and the hollow fixed shaft 30 which is rotatably fitted therein, and is being exhausted from said torque converter chamber 14 via the central hole 46 of the power output shaft 26.

When the valve spool element 76 of the drain control valve 72 is in its rightmost position within its valve bore 74 as shown in FIG. 2, and when the amount of slippage of the lock up clutch assembly is relatively low or zero, i.e. the difference between the rotational speed of the front cover 10 and the rotational speed of the power output shaft 26 of the torque converter is relatively low, so that as explained above the output pressure from the slippage control hydraulic fluid pump 62 at its output port 70 is zero or very low, then the port 86 is opened by the land 83 of said drain control valve 72 to a relatively great extent and is relatively freely communicated with the drain port 88. In these circumstances, the hydraulic fluid pressure which is being supplied to the torque converter chamber 14 is to a relatively large extent drained through the port 86 and the drain port 88, and this causes a relatively large drop in pressure in the torque converter chamber 14 on the right side in FIG. 1 of the disk shaped piston member 34 of the lock up clutch assembly, thus reducing the pressure of the clutch engaging surface 36 of said disk shaped piston member 34 against the annular clutch lining 38 on the front cover 10 and increasing the slippage amount of the lock up clutch assembly, i.e. decreasing its torque transmission capability.

Subsequent to this, as the relative rotational speed (the difference in the rotational speeds) of the front cover 10 and the power output shaft 26 increases due to this increased slippage amount of the lock up clutch assembly, the output pressure from the slippage control hydraulic fluid pump 62 at its output port 70 increases, and this pressure is supplied via the passage 90 to the control chamber 84 of the drain control valve 72, thus driving the valve spool element 76 of said drain control valve 72 leftwards from the point of view of FIG. 2 against the biasing action of the compression coil spring 80 which is overcome. This causes the port 86 to now be opened by the land 83 of said valve spool element 76 of said drain control valve 72 to a relatively lesser extent, so as to be relatively lesser freely communicated with the drain port 88. In these circumstances, the hydraulic fluid pressure which is being supplied to the torque converter chamber 14 is now to a relatively lesser extent drained through the port 86 and the drain port 88, and this causes the draining of the pressure in the torque converter chamber 14 on the right side of FIG. 1 of the disk shaped piston member 34 of the lock up clutch assembly to now take place more slowly than before, thus increasing the value of said pressure in the torque converter chamber 14 and increasing the pressure of the clutch engaging surface 36 of the disk shaped piston member 34 against the annular clutch lining 38 on the front cover 10 and thereby decreasing the slippage amount of the lock up clutch assembly, i.e. increasing its torque transmission capability.

Accordingly it will be understood that, by a combination of these two effects in a form of negative feedback control, the torque transmission capability of the lock up clutch assembly is, of course when said lock up clutch assembly assembly is in the engaged condition, maintained at such a value that, while said lock up clutch assembly never slips unduly, at the same time said lock up clutch assembly never becomes fully locked up. In other words, while avoiding the occurrence of undue slippage of said lock up clutch assembly, at the same time it is ensured that it is effectively and reliably prevented that the input member of said lock up clutch assembly and the output member thereof should ever become completely rotationally locked together, and on the contrary a certain degree of slippage between said input member and said output member is always allowed. By this means, the rotational vibration and torque fluctuations which inevitably are always present in the rotational power fed to this torque converter assembly are always effectively prevented from being directly transmitted through said torque converter assembly, when this lock up clutch assembly is in the engaged condition, to the output of said torque converter assembly and to devices connected thereto such as a vehicle transmission and/or a differential device. Thereby the service life and the reliability of said devices which are further down in the power train are advantageously promoted, and also the noise level and the vibration level present in the passenger compartment of a vehicle to which this torque converter is fitted are reduced, and the ridability of such a vehicle is enhanced. Because this slippage control system for the lock up clutch assembly is entirely mechanical/hydraulic in its construction, and does not incorporate any electronic components, it is reliable and low in cost both with regard to its components and with regard to its assembly. Further, the reliability and the effectiveness of this preferred embodiment of the slippage control system for a fluid coupling lock up clutch assembly of the present invention are promoted by its functioning by a feedback process as detailed above.

Further to the description of the operation given above, if for some reason the output pressure from the slippage control hydraulic fluid pump 62 at its output port 70 increases excessively, then this pressure, which is supplied via the passage 90 to the control chamber 84 of the drain control valve 72, will drive the valve spool element 76 of said drain control valve 72 so far in the leftwards direction from the point of view of FIG. 2 against the biasing action of the compression coil spring 80 which is completely overcome, that the port 86 will now be communicated past the other side of the land 83 of said valve spool element 76 of said drain control valve 72 to the control chamber 84. In these circumstances, this abnormally high hydraulic fluid pressure which is being outputted from the slippage control hydraulic fluid pump 62 will be bled off via its output port 70 and via the passage 90 and the control chamber 84 of the drain control valve 72 through the port 86, and accordingly is lowered. Thereby, this hydraulic fluid pressure which is being outputted from the slippage control hydraulic fluid pump 62 is effectively prevented from ever being in an abnormally high pressure state.

On the other hand, when this slippage control as described above is not required to be practiced by this preferred embodiment of the slippage control system for a fluid coupling lock up clutch assembly of the present invention, as for example when the vehicle incorporating this torque converter is travelling at high speed so that engine rotation vibration and the like do not present any substantial problem, then an override system is used to eliminate clutch slippage. The override system includes a hydraulic control system which is not particularly shown and supplies hydraulic fluid pressure via the passage 118 and via the passages 115, 114, 112, and so on to the pressure chamber 108 of the hydraulic control valve 96, and then the valve spool element 100 of said hydraulic control valve 96 is positioned to its extreme leftwards position from the point of view of FIG. 2 in its valve bore 98 against the biasing action of the compression coil spring 104 which is overcome, and in this state of the apparatus the port 110 is not substantially interrupted by the land 101 of the valve spool element 100, and the pressure chamber 108 and the port 110 are communicated together, and thereby the pressure supplied from the passage 112 is fed via the pressure chamber 108 to the control chamber 84 of the drain control valve 72 via the port 110 and the conduit 90, and thus, regardless of the current value of the pressure which is being outputted from the slippage control hydraulic fluid pump 62, the valve spool element 76 of this drain control valve 72 is driven to its extreme leftwards position in its valve bore 74 from the point of view of FIG. 2, thus closing the port 86 of said drain control valve 72. Therefore, in this operational condition the pressure in the torque converter chamber 14 to the right of the disk shaped piston member 34 is not substantially drained through the drain control valve 72, and accordingly this pressure in the torque converter chamber 14, which is relatively large, presses on said disk shaped piston member 34, thus firmly pressing the clutch engaging surface 36 against the annular clutch lining 38, thus providing the fully locked up condition for the lock up clutch assembly.

Conclusion

It is acceptable, according to the principle of the present invention, if the hydraulic fluid pressure pump which is driven according to the relative rotational speed between the input member of the fluid coupling and the output member thereof, such as the slippage control hydraulic fluid pump 62 of the shown construction, is a rotary pump such as a vane type pump, rather than being an internal meshing gear wheel type pump as was the case in the preferred embodiments disclosed above.

As a possible modification to the preferred embodiment of the present invention as disclosed above, if the power of the hydraulic fluid pressure pump which is driven according to the relative rotational speed between the input member of the fluid coupling and the output member thereof were sufficient to operate the lock up clutch assembly by itself, it would be possible for said pump to thus operate said lock up clutch assembly directly. In such a case, no extraneous source of hydraulic fluid pressure, such as the one located off to the right side of FIG. 1 and discussed above but not shown in the drawings, would be required. Other modifications are also possible. Therefore, although the present invention has been shown and described in terms of the preferred embodiment thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiment, or of the drawings, but solely by the scope of the accompanying claims, which follow.

What is claimed is:

1. For a fluid coupling comprising a housing including a front cover portion and a pump outer shell portion, a fluid torque converter incorporated in said housing adjacent said pump outer shell portion and including a pump impeller supported by said pump outer shell portion, a turbine member and a stator member, a lock up clutch incorporated in said housing adjacent said front cover portion and including a first friction member supported by said front cover portion and a second friction member adapted to be selectively frictionally pressed against said first friction member by a fluid pressure supplied to a chamber space defined on one side of said second friction member remote from said front cover portion, a shaft member disposed along a common central axis of said housing, said torque converter and said lock up clutch being rotatable therearound, and a hub member mounted on said shaft member and supporting said turbine member so as to transmit rotational torque between said turbine member and said shaft member, said hub being also connected with said second friction member of said lock up clutch so as to transmit rotational torque between said second friction member and said shaft member;

a slip control system for said lock up clutch, comprising:

pump means in said hub for providing a delivery of fluid according to a rotation of said housing relative to said turbine member; and a fluid control system including:

(a) a first spool element slidably received in a first bore formed in said hub, (b) a fluid passage formed through said hub and connecting said chamber space to a drain via said first bore, (c) means for biasing said first spool element by the fluid delivered by said pump means so as to increasingly throttle said fluid passage as said pump means provides a larger delivery, and (d) an override system for selectively supplying a fluid pressure from an outside fluid pressure source to said first spool element so that said first spool element is biased so as to completely interrupt said fluid passage.

2. A slip control system according to claim 1, wherein said override system comprises a second spool element slidably received in a second bore formed in said hub for connecting said outside fluid pressure source to said first bore, said second spool element being shiftable in said second bore between a first shift position where it interrupts communication of said outside pressure source to said first bore and a second shift position where it communicates said outside pressure source to said first bore.

3. A slip control system according to claim 2, wherein said second spool element is shifted from said first shift position to said second shift position by the fluid pressure supplied thereto from said outside pressure source, said fluid pressure from said outside source being applied to an end face of said second spool element.

* * * * *